United States Patent
Stratton et al.

[11] Patent Number: 5,970,193
[45] Date of Patent: Oct. 19, 1999

[54] DATA COMMUNICATIONS STRUCTURES RELATING TO DATA SHELF CONFIGURATIONS

[75] Inventors: Mark D. Stratton, Boulder, Colo.; Roderick E. Wallace, Lanark County, Canada

[73] Assignee: Nortel Networks Corporation, Montreal, Canada

[21] Appl. No.: 08/949,450

[22] Filed: Oct. 14, 1997

Related U.S. Application Data

[60] Provisional application No. 60/029,615, Oct. 24, 1996.

[51] Int. Cl.⁶ .................................................... G02B 6/36
[52] U.S. Cl. .................................. 385/89; 385/92; 385/59; 385/76; 385/135
[58] Field of Search .................................. 385/88–94, 76, 385/59, 135, 136, 137; 257/672–679

[56] References Cited

U.S. PATENT DOCUMENTS

| | | | |
|---|---|---|---|
| 4,738,632 | 4/1988 | Schmidt et al. | 439/341 |
| 5,013,247 | 5/1991 | Watson | 385/56 |
| 5,069,522 | 12/1991 | Block et al. | 385/39 |
| 5,241,614 | 8/1993 | Ecker et al. | 385/89 |
| 5,297,229 | 3/1994 | Shimada et al. | 385/135 |
| 5,325,455 | 6/1994 | Henson et al. | 385/89 |

FOREIGN PATENT DOCUMENTS

| | | |
|---|---|---|
| 0 236 711 | 9/1987 | European Pat. Off. . |
| 0 672 926 A1 | 9/1995 | European Pat. Off. . |
| WO 92/03887 | 3/1992 | WIPO . |

*Primary Examiner*—Hemang Sanghavi
*Attorney, Agent, or Firm*—Foley & Lardner

[57] ABSTRACT

Interconnection module for connection to other interconnection modules to provide a back plane of any desired size and configuration in electronic data shelf arrangements. The module has optical terminals extending from a front face for signal transmission and reception relationship terminals, preferably optical terminals, for signal interconnection with at lest one other interconnection module. Signal conductors extend from the terminals of the front face to the terminals of the other face. Flat cables are conveniently used to interconnect modules which may be relatively positioned horizontally or vertically spaced or both.

16 Claims, 4 Drawing Sheets

DATA COMMUNICATIONS STRUCTURES RELATING TO DATA SHELF CONFIGURATIONS

This application claims benefit of Provisional Appln No. 60/029,615 Oct. 24, 1996.

This invention relates to data communications structures relating to data shelf configurations.

Data communications structures relating to data shelf configurations conventionally comprise shelves having receiving stations for edge cards and printed circuit boards providing electrical interconnection boards between the edge cards when the edge cards are in their receiving stations. In some shelf arrangements, the interconnection boards are referred to as "back planes" because they are disposed across the rears of the shelves. In other arrangements, shelves are disposed back-to-back with an interconnection board disposed between them. To be accurate, the latter interconnection boards should be referred to as "mid-planes" as they are in a mid-plane position between shelves, but in this specification and appendant claims, the general term "back plane" is considered to include both a mid-plane and a back plane configuration.

Conventional shelf configuration designs have been, in the past, satisfactory for the transmission of data signals. It is now becoming apparent, however, that such designs are inadequate for use with high volume data signal transmission and there is a lack of design flexibility to allow for changes in shelf configuration to accommodate data volume increase. One reason for this is that connectors between the edge cards and their back planes place an upper limit on the signal density which may be placed upon a telecommunications system and signal integrity issues arise from the use of conventional back planes and connectors when data rates progress at increasingly higher speeds. Thus conventional design criteria involving back plane structures place rigid operational requirements on a transmission system.

The present invention seeks to provide data connection structures which will minimize the above problems.

According to one aspect of the invention there is provided an interconnection module for interconnecting edge cards in a data shelf, the module having a front face and other faces, a first group of optical terminals facing forwardly from the front face for transmitting or receiving optical signals from optical terminals of an edge card to be located forwardly from the front face, a second group of optical terminals directed outwardly from another of the faces of the module for optical signal interconnection with another interconnection module, and a plurality of signal conductors interconnecting terminals of the first group with terminals of the second group.

An interconnection module according to the invention forms a building block for signal interconnection with another interconnection module with each of the modules having an edge card extending from it. Hence, the edge cards are interconnected by the modules for transmission and reception of signals between the edge cards. Thus, with the modules acting together as an edge card interconnection structure, the modules act as a replacement for a back plane while providing a similar function. Modules of the invention may be interconnected to provide an edge card interconnection structure of any required size, i.e. composed of any required numbers of modules, dependent upon the data processing requirements of the structure and the edge card requirements needed for this purpose. Thus, the use of a desired number of modules in an edge card interconnection structure provide for incremental increases in performance and functional capabilities of a shelf system with minimal impact on fundamental design of the functional elements, i.e. the interconnection modules. Also, incremental increases in bandwith requirements may be accommodated and placed upon the demands of the system application.

In the above interconnection module according to the invention, two or more second groups of terminals may be provided. These second groups may be directed outwardly from side faces of the module, one group to a side face, or one or more second groups may be directed outwardly from a rear face of the module. Preferably, the first group of terminals comprises a plurality of laser transmitters and receivers for cooperation with corresponding transmitters and receivers providing optical terminals of an edge card. This provides for non-contact high speed optical interconnections between the edge card and the module while permitting more relaxed mechanical alignment requirements than would be required if optical connectors were used.

While a second group of terminals may be electrical, then for increased transmission speed, each second group is preferably provided by at least one optical connector for connection directly into an optical connector of another interconnection module. However, this construction calls for strict and definite placement of adjacent modules. It is preferred therefore that the modules are intended to be interconnected together by flexible optical cables thereby permitting relaxation in relative positioning of the modules. Alternatively, the optical terminals of the second group may be laser transmitters and receivers so that the modules may be spaced apart with the signals passing through free space while also relaxing alignment requirements of modules.

In practical arrangements, the signal conductors comprise electrical conductors and incoming optical signals are converted to corresponding electrical signals for transmission along associated conductors to be later changed to corresponding optical signals for transmission from transmitters at the other end of the conductor. Methods of conversion between optical and electrical signals is well known in the art and need not be explained further. When two or more second groups of terminals are provided, the electrical conductors may be arranged so that signal routing may be changed by a switch incorporated into the module. Such a switch is conveniently provided by an integrated circuit component. The signal routing change may be made from a route between an optical terminal of the first group and a specific terminal of a second group to another route between the optical terminal of the first group and a specific terminal of another second group. Alternatively, the signal re-routing change may be made between a specific terminal of a second group and a terminal of the first group to a route between the specific terminal of that second group and a specific terminal of another second group. With the latter type of change, signals may be sent through an intermediate module from a transmitting to a receiving module while bypassing an edge card optically interconnected with the intermediate module.

Embodiments of the invention will now be described, by way of example, with reference to the accompanying drawings, in which.

Figure 1:
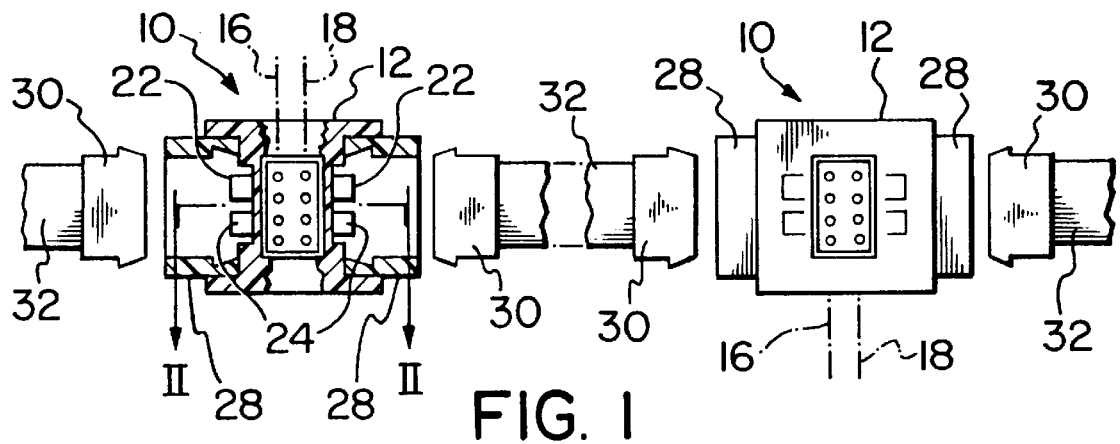
FIG. 1 is a front view of an interconnection module according to a first embodiment and partly in section and shown in exploded relationship with a flat optical cable and a further interconnection module in an interconnection structure.
Figure 2:
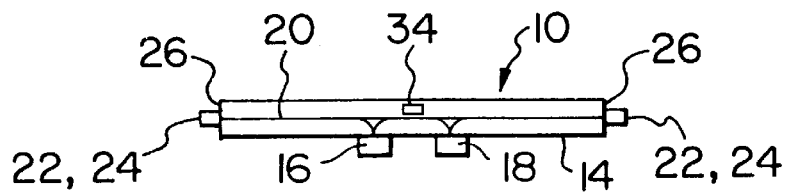
FIG. 2 is a diagrammatic view of the module of FIG. 1 taken along line II—II in FIG. 1.

As shown by FIG. 1, an interconnection module 10 for interconnecting edge cards and according to a first embodiment comprises a rectangular main housing 12 having a front face 14 (FIG. 2). The module 10 is for use in high volume data transmission systems and which may be expected to have an increase in volume capacity. From the front face is directed a group of optical terminals for optical interconnection with corresponding terminals of an edge card as will be described. This group of terminals comprises a vertical series of laser transmitters 16 and a vertical series of laser receivers 18, the receivers and transmitters lying in side-by-side relationship as shown in FIG. 1. As shown by FIGS. 1 and 2, each of the transmitters and receivers 16 and 18 is interconnected by an electrical conductor 20 provided within the housing 12, respectively, to an optical receiving terminal 22 or an optical transmitting terminal 24 directed outwardly from each of two oppositely facing side faces 26 of the housing 12. At each side face 26 the optical receiving and transmitting terminals 22 and 24 form a group of terminals with the transmitting terminals 24 as one subgroup and the receiving terminals 22 as another subgroup as shown by FIG. 1. In FIG. 2, the conductors 20 are superimposed and the terminals 22 and 24 are superimposed, At each side surface, a female subhousing 28 (FIG. 1 only) extends outwardly from the face 26 for mechanical connection of an end fitting 30 of a flat optical cable 32 for connection of the module 10 to another and substantially identical module 10 as will be described. Signals received by the laser receivers 18 are transmitted to the optical transmitting terminals 24 and signals received by the receiving terminals 22 are transmitted to the laser transmitters 16. For transmission, all optical signals are converted into electrical signals to be transmitted along the conductors 20 and then re-converted into optical signals. This conversion is performed in a manner known in the field of transmission.

The interconnection module 10 is also provided with a switch means which is conveniently in the form of an integrated circuit component, shown diagrammatically at 34 in FIG. 2. This switch means is operable as desired for changing the routing of signals passing through the module 10 to direct the signals to their required destination within a completed shelf as will be described. In greater detail, optical signals received by the laser receivers 18 may be directed under switch control either to an individual optical transmitting terminal 24 at each side face 26 of the module or the signals may be selectively transmitted to one of these terminals 24 only. Alternatively, signals received by any of the receiving terminals 22 at either face 26 may be switch controlled to be passed to a laser transmitter 16 or to be directed to a transmitting terminal 24 at the other side face thereby bypassing the laser transmitters 16 altogether.

With the module 10 interconnected by a flat flexible optical cable 32 to at least one other and identical module 10 there is provided an interconnection structure for edge cards, this interconnection structure being as a replacement for a conventional back plane as used in telecommunications shelves.

Figure 3:
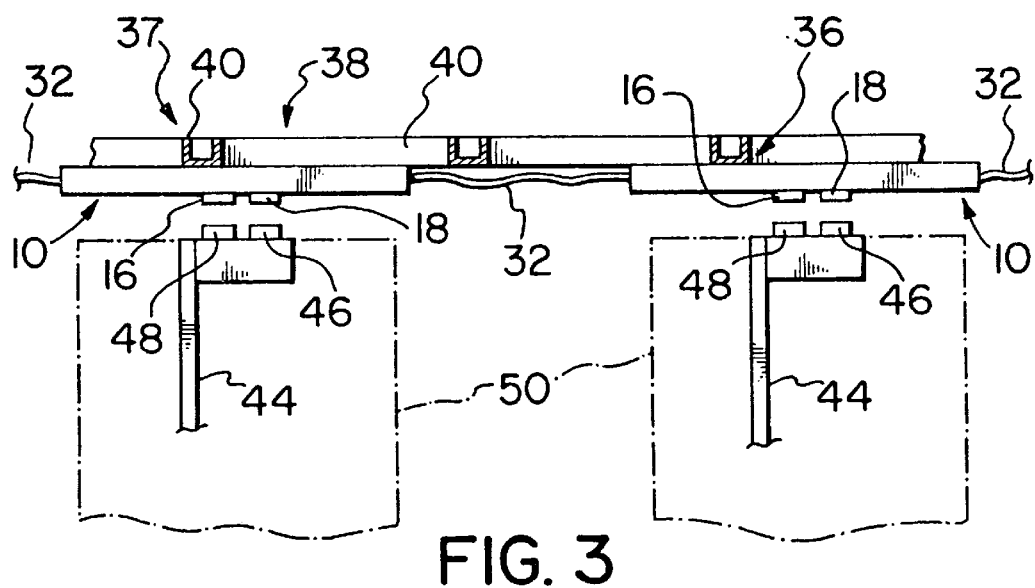
FIG. 3 is a diagrammatic plan view of two interconnection modules joined together to form an interconnection structure for interconnecting to edge cards.
Figure 4:
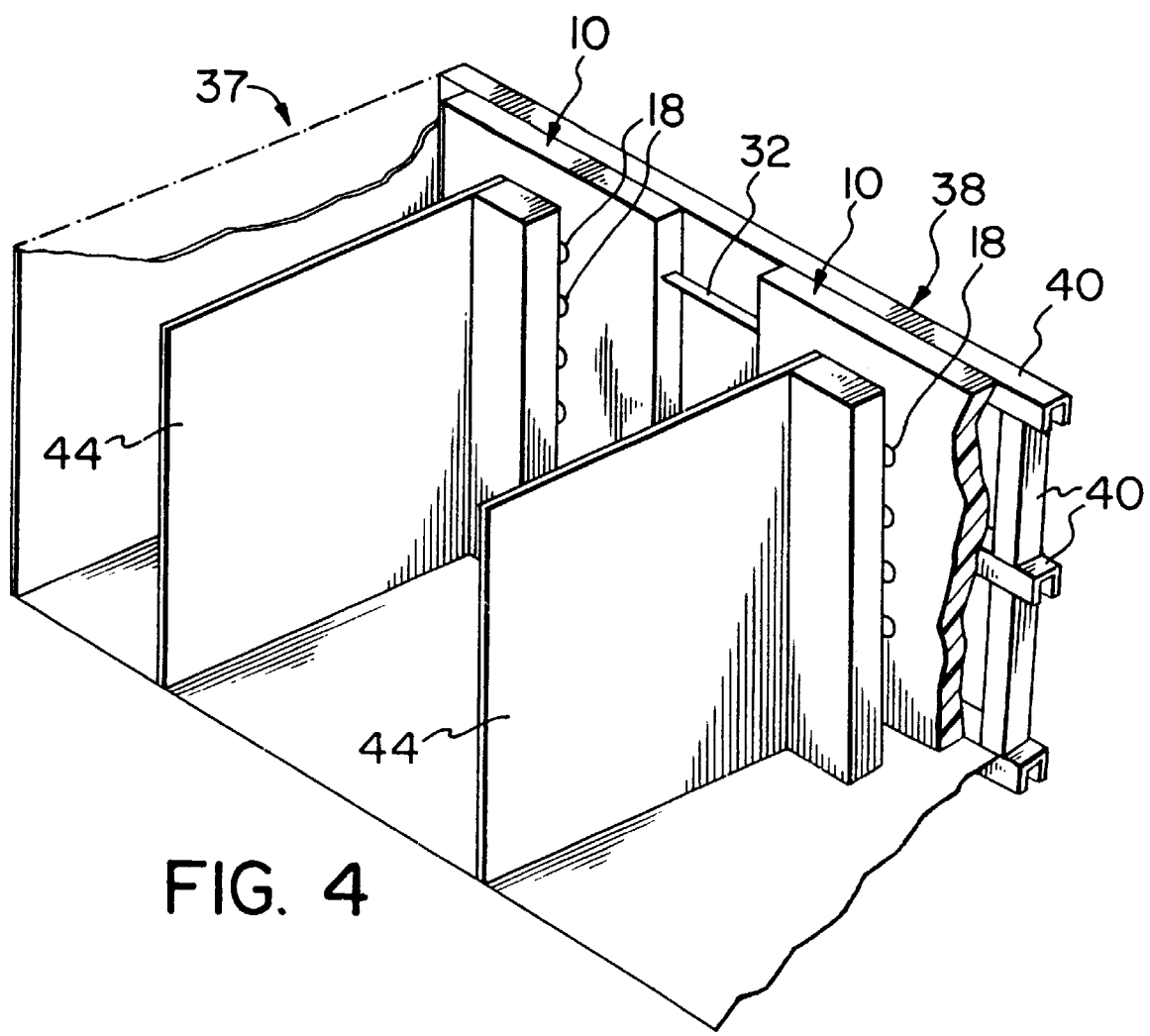
FIG. 4 is a diagrammatic isometric view of part of a shelf showing the edge cards and interconnection modules of FIG. 3.

Thus, as shown in FIG. 3, in the simplest form of an interconnection structure 36, two modules 10 are disposed in spaced side-by-side positions so as to be substantially coplanar with a cable 32 extending between them. This is conveniently provided by having a data shelf 37 with an open vertical wall 38 formed by parallel and spaced-apart rigid metal members 40 for instance as shown by FIGS. 3 and 4. Of course any other type of supporting wall would do for this purpose. The two modules 10 are secured to the wall 38 by means not shown and as the cable 32 is flexible it permits freedom in the relative positioning of the modules 10. As shown by FIG. 4, the front of the shelf 37 is open for sliding reception of edge cards 44. Each of the edge cards 44 is optically interconnected with an associated module 10 by having laser receivers and transmitters 46 and 48 directed outwardly from a rear of the edge card. Each edge card is guided and conveniently located in position within the shelf until it engages an abutment surface (not shown) to space the edge card slightly forwardly of its associated module 10 as shown in FIG. 3. In this position, optical signals may be conveyed across free space between the laser transmitters and receivers 16, 18, 46 and 48. The use of laser transmitters and receivers in this case, does of course, enable a large amount of freedom in relative positioning of the modules 10 and the edge cards 44 while still retaining the capability of transmitting the signals between modules and edge cards. It is desirable that the distance between the rear of each of the edge cards 44 and its module 10 is minimized so as to permit signal transfer between laser transmitters and their respective receivers while removing possibilities of transfer of signals to another receiver. In addition, the optical ports of the transmitters and receivers are preferably covered with filter elements (not shown) provided to minimize the influence of ambient light upon signal transmission and reception.

As may be seen from the above description, the modules 10 are assembled together as required to provide sufficient interconnection structure for the required function of the system which is to be built. Hence, sufficient modules 10 are assembled together with the cables 32 to accommodate the absolute requirements of quantities of edge cards 44. Thus, as a minimum requirement, two modules 10 are assembled as shown by FIG. 3. The number of modules and edge cards may be subsequently increased or changed as demand increases or changes. Thus the use of the interconnect modules 10 provides for incremental increases not only in size but in the accompanying performance and functional capabilities of a required system while having minimum impact on the fundamental designs of the elements themselves, i.e. the modules 10 which may be of basically the same design. The use of the modules 10 in desired numbers does of course allow for incremental increases in bandwidth requirements and is particularly useful for increasing high volume data transmission.

The embodiment as described above is shown in the drawings as a diagrammatic representation of the various features. Thus, the modules are shown particularly wide thereby providing large gaps between the edge cards 44. Of course, in practice, the dimensions of each of the modules 10 may be different from that shown in the Figures so as to reduce the required distances between edge cards 44 whereby these distances may be minimized. Alternatively, each of the interconnection modules 10 may be connected instead of to an individual edge card 44, to two or more edge cards in an individual circuit pack 50 (chain-dotted outlines in FIG. 3) which are of substantial width compared to each of the edge cards 44 thereby enabling a module 10 to be of wide configuration for close relative positioning of the circuit packs 50.

Figure 5:
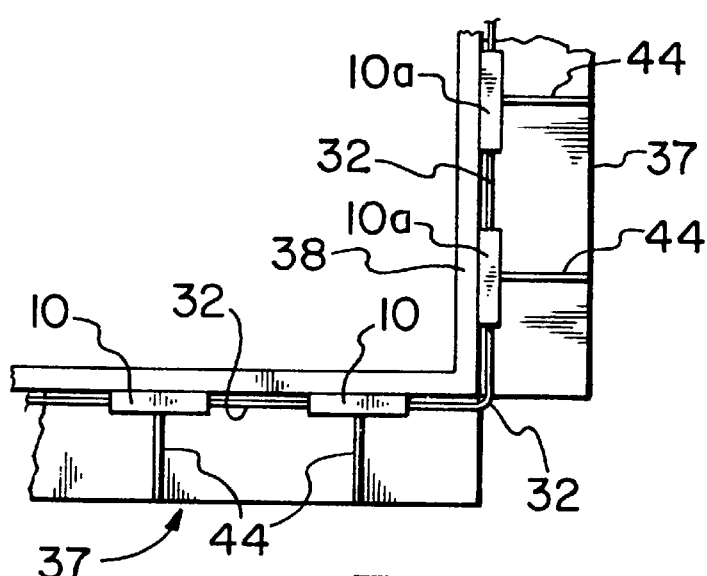
FIG. 5 is a view similar to FIG. 3 and to a smaller scale and showing an alternative manner of using interconnection modules of the first embodiment.

As may be seen from FIG. 5, the modules 10 need not even be assembled in substantially the same plane. For instance, in FIG. 5, modules 10 in substantially the same plane and as described in FIG. 3 are connected at one end by a flexible cable 32 to an identical interconnection module 10a lying in an adjacent shelf at a different angle. Thus the size of the interconnection structure provided by incremental aggregation of the modules 10 is not dependent upon a particular wall area in a room but may be continued onto another wall area lying in a different plane and supporting additional shelves so as to extend the size of the structure.

Figure 6:
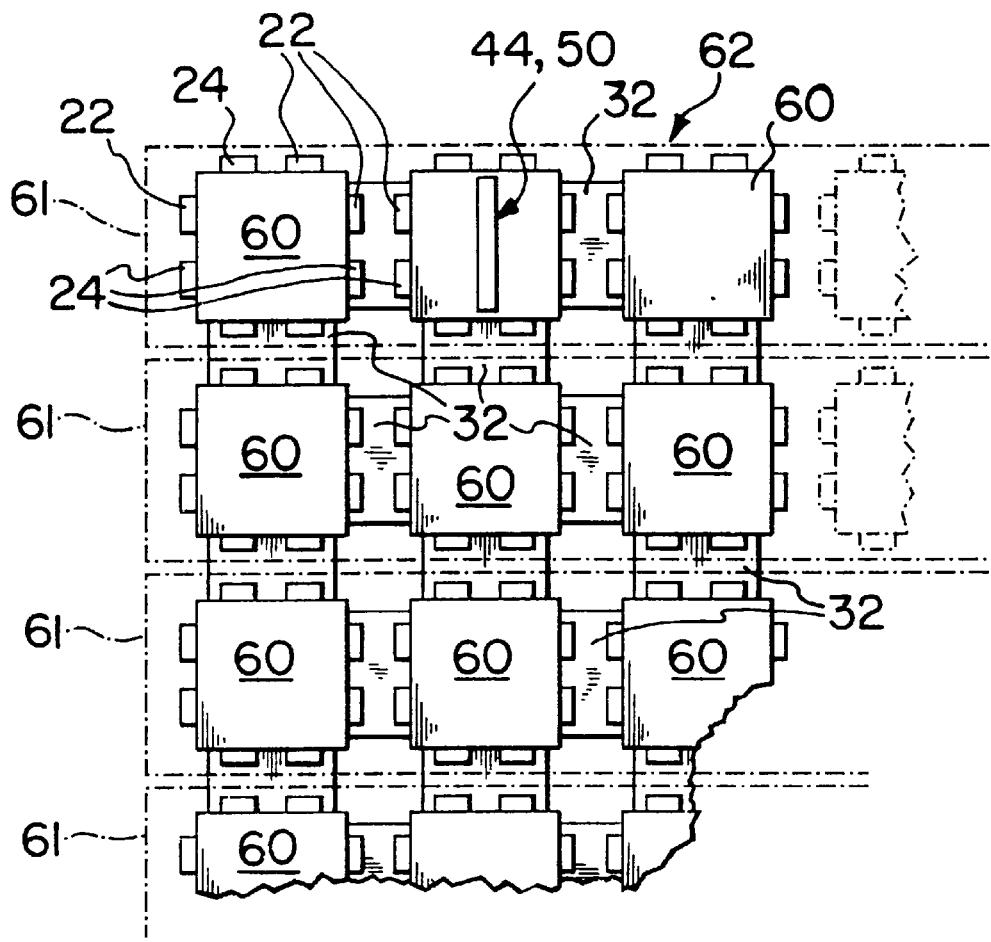
FIG. 6 is a diagrammatic front view showing a multi-tiered shelf system with a plurality of modules according to a second embodiment arranged as an interconnection structure for edge cards.

As shown diagrammatically by FIG. 6, and in a second embodiment, interconnection modules 60 are basically of the same design as modules 10 of the first embodiment except in the second embodiment, the modules 60 are provided with two further groups of optical transmission and receiving terminals 24 and 22 on the other side faces 26 of the rectangular shaped module. With this configuration and as shown by FIG. 6, the modules need not only be caused to extend and be connected in a horizontal direction in a horizontal shelf, but also in a vertical direction from shelf 61 to shelf 61 by the use of optical cables 32. This enables an increase in the area of the interconnection structure 62 of a module assembly both in the vertical and horizontal directions. In this arrangement, each of the modules 60 is connected to its own individual edge card 44 or circuit pack 50 shown in one of the positions only in FIG. 6. As in the first embodiment, of course, the relative positioning of the modules 60 need only be loosely controlled because of the flexible nature of the cables 32.

Figure 7:
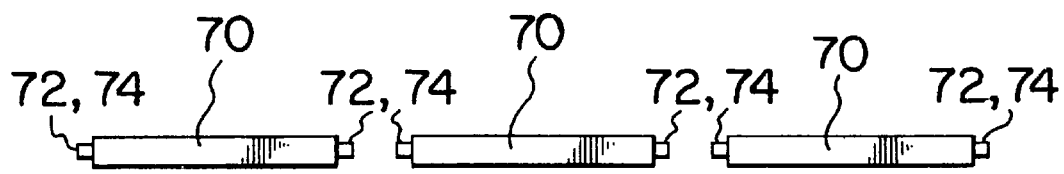
FIGS. 7, 8 and 9 are views similar to FIG. 3 showing the positional relationship of third, fourth and fifth embodiments for providing interconnection structures for edge cards.

In a third embodiment as shown by FIG. 7, the optical transmission and receiving terminals 24, 22 on the side faces 26 of each of modules 10 are replaced in a module 70 with laser transmitters and receivers 72 and 74 which are superimposed in the Figure. With this arrangement adjacent modules may be interconnected across free space between the laser transmitters and receivers thereby increasing the freedom in positioning of modules and edge cards.

Figure 8:
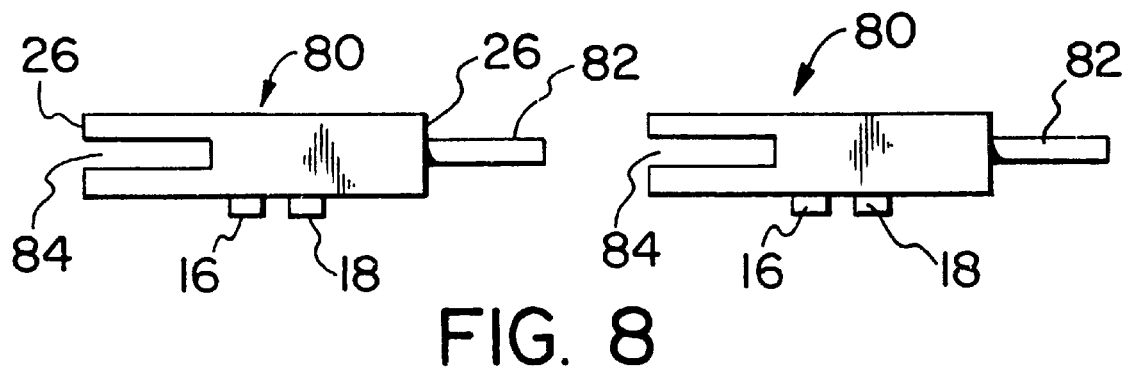

In a fourth embodiment as shown in FIG. 8, the optical transmitting and receiving terminals 24 and 22 of the modules 10 are replaced in a module 80 at one side face 26 by a rigid male optical connector 82 and at an opposite side face 26 by a female connector 84. Hence adjacent modules 80 may be rigidly connected together by insertion of connectors 82 within connectors 84 in the manner shown in FIG. 8. This particular embodiment suffers the disadvantage of course that absolute alignment is required between the modules 80 as distinct from the looseness in positioning of the modules in previous embodiments.

Figure 9:
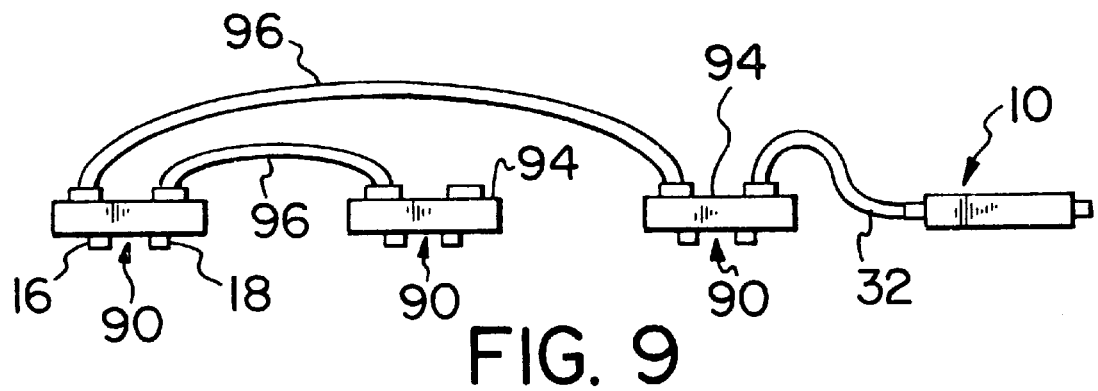

In a fifth embodiment as shown in FIG. 9, a module 90 is basically of the structure of module 10 in the first embodiment except that each vertical group of the optical transmitting and receiving terminals 24 and 22 are contained in vertical alignment as a group 92 extending outwardly from a rear face 94 of the module. As may be seen, with this particular case, adjacent modules may be connected together by flexible cables 96 which are curved substantially to U-shape between the modules. With this arrangement also it is permitted to provide cables 96 of any required length with some of these cables possibly extending between modules which are spaced apart by other modules as shown by FIG. 9. In addition, of course, a module 90 is connectable to a module 10 of the first embodiment, with a flexible optical cable 32.

What is claimed is:

1. An interconnection module for interconnecting edge cards in a data shelf, the module having a front face and other faces, a first group of optical terminals facing forwardly from the front face for transmitting or receiving optical signals from optical terminals of an edge card to be located forwardly from the front face, a second group of terminals directed outwardly from another of the faces of the module for signal interconnection with another interconnection module, and a plurality of signal conductors interconnecting terminals of the first group with terminals of the second group.

2. An interconnection module according to claim 1 wherein the terminals of the second group are optical terminals.

3. An interconnection module according to claim 2 having side faces and a rear face and the second group of terminals is directed outwardly from one of the side faces.

4. An interconnection module according to claim 3 wherein two second groups of optical terminals are provided and the second groups are directed outwardly from oppositely facing side faces of the module.

5. An interconnection module according to claim 4 having four side faces and four second groups of terminals are provided, the four groups each directed outwardly from an individual side face of the module.

6. An interconnection module according to claim 2 wherein the terminals of the first group are laser transmitting and receiving terminals.

7. An interconnection module according to claim 6 wherein the second group of terminals are laser transmitting and receiving terminals.

8. An interconnection module according to claim 2 having side faces and a rear face and the second group of terminals is directed outwardly from the rear face.

9. An interconnection module according to claim 4 wherein some at least of the terminals of the first group are interconnected by signal conductors with terminals of each of the second groups and terminals of the second groups are interconnected by signal terminals.

10. An interconnection module according to claim 9 wherein switch means is provided for opening and closing optical interconnections between the first and second terminal groups alternatively to optically interconnect terminals of the first group with terminals of at least one of the second groups or to interconnect terminals of the second groups while bypassing the terminals of the first group.

11. In combination, a data shelf, a plurality of edge card interconnection modules, and a plurality of edge cards;
   the shelf having receiving stations and having two opposite sides, a first of the opposite sides provided for mounting the interconnection modules in desired positions and a second of the opposite sides being open for receiving the edge cards into individual receiving stations in the shelf;
   each edge card comprising one edge region having optical terminals facing outwards from the edge region;
   and each of the modules having a front face with a first group of optical terminals directed outwards and forwards from the front face and second group of optical terminals directed outwardly from another face, the module being mountable in its desired position to the shelf with the terminals of the first group facing into the shelf for optical signal interconnection with optical terminals of an associated edge card when the edge card is received in its individual receiving station, and the second group of terminals facing in another direction for optical signal interconnection with terminals of a second group of one of the other modules when the other module is mounted in its desired position to the shelf thereby providing an interconnection structure between edge cards.

12. A combination according to claim 11 wherein a plurality of flat flexible cables is provided having conductors each with terminals at its opposite ends, each cable being connectable between second groups of terminals of two modules to interconnect terminals of one of the second groups with terminals of the other second group in the interconnection structure.

13. A combination according to claim 12 wherein at least some of the modules have a plurality of second groups of terminals and the modules are disposed in their desired positions in the shelf in an in-series relationship with the flexible cables interconnecting the second groups of terminals of the modules.

14. A combination according to claim 13 wherein at least some of the modules have a plurality of second groups of terminals and the modules are disposable in their desired positions side-by-side in a first direction and also side-by-side in a second direction normal to the first direction with the flexible cables interconnecting the second groups of modules in both the first and second directions.

15. A combination according to claim 14 wherein each of the second groups of terminals is provided upon a side surface of its respective module.

16. A combination according to claim 11 wherein in each module the second group of terminals extends outwardly from a rear face of the module.

* * * * *